United States Patent Office

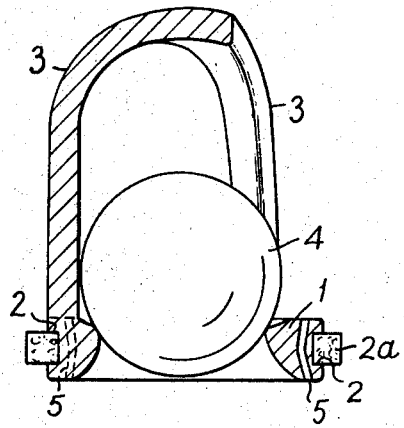
Fig.1
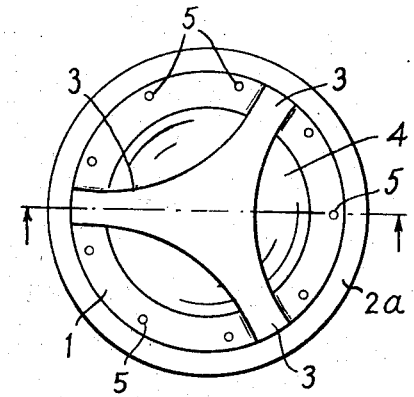
Fig.2
Fig.3
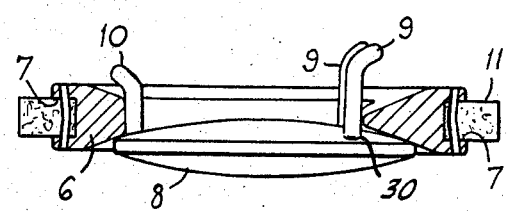
Fig.4
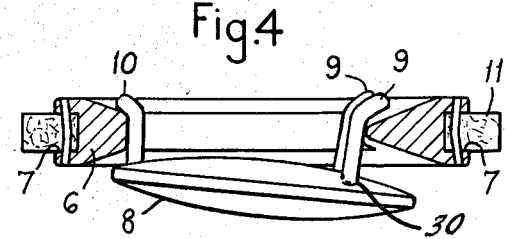

3,526,906
Patented Sept. 8, 1970

3,526,906
PROSTHETIC IMPLANTS MADE FROM CARBONACEOUS MATERIALS
Henry G. De Laszlo, Engelfield Green, England, assignor to Societe le Carbone-Lorraine, Paris, France, a French body corporate
Filed Oct. 10, 1966, Ser. No. 585,688
Claims priority, application Great Britain, Nov. 5, 1965, 47,055/65
Int. Cl. A61f 1/22, 1/24
U.S. Cl. 3—1    8 Claims

ABSTRACT OF THE DISCLOSURE

A prosthesis for implanting into a human or other animal body is made mainly of elemental carbon or graphite in the form of a non-metallic, electrically non-insulating member or piece of tissue. Cage and ball or lenticular heart valves, vascular grafts, patches and artificial bone processes are examples of such prostheses.

---

The present invention relates to prostheses, a surface or surfaces of which are to be subjected to the flowing circulation of the live blood of a human being or other animal. Examples of prostheses to which the invention relates are the cages, comprising seatings and housings, and the gaskets of artificial heart valves of the caged-ball or other type. Other examples are vascular grafts, replacement trachea and bronchi and patches and the like for repairing holes in tissue, such as the walls of the chamber of the heart. The invention also relates to prosthetic bone.

A main object of the invention is to provide prostheses for these and other purposes which shall be electrically-conducting, anti-thrombogenic, will tend to avoid the clotting of blood and will be unaffected by the enzymes and other vital constituents of the blood and will not affect or change these constituents of blood, thus, that they shall act in a neutral manner.

It should thus be understood that hereinafter the expression "prostheses" shall include any artificial member or piece of tissue as the context so demands or admits.

It is a further object of the invention to simplify prostheses and render them more readily insertable. It is a further object to decrease the weight of artificial or replacement parts, such as heart valves and bone prostheses as hitherto used, and at the same time, to make their manufacture more economical than has hitherto been the case with prostheses available up to the present time.

Much and very important work has already been done in this field as is shown, for example, in various patent specifications and mention may be made, inter alia, of the heart valves disclosed in British patent specification No. 917,341 in the name of M. L. Edwards, and in British registered designs Nos. 921,883, 921,884 and 925,246 in the name of D. G. Melrose. Vascular and other graft material has been successfully manufactured by The United States Catheter and Instrument Corporation, as shown, for example, in the specification of their German Pat. No. 1,156,934. Analogous surgical prostheses have been introduced by Ethicon Incorporated of New York, as shown, for example, in their German patent specification No. 1,185,332. Artificial bone has also been made as disclosed for example in French patent specification No. 1,359,096 in the name of The Haeger Potteries Inc.

Generally speaking, the materials used in the manufacture of the cages for heart valves has been of metals or metal alloys, such as stainless steel, titanium or Stellite 21. Alternatively, certain plastics materials have been used, for example, polypropylene, and in conjunction with these, various synthetic plastics fabric materials have been developed and used for attaching such devices to body tissue. Some of the most important materials used for this purpose are polytetrafluorethylene, polypropylene and various polyamides and polyesters. Metals and metal alloys have, in this connection, the disadvantage of weight and certain of the more sophisticated alloys used are also extremely expensive to work, and emboli tend to attach themselves to the surfaces of metals and alloys. One of the disadvantages inherent in the use of plastics material is that these materials are insulators, and consequently, when they constitute a surface or surfaces past which blood must flow, electrostatic charges are set up in these materials which have been known to favour the formation of thromboses and emboli in the bloodstream.

It is thus a further object of the invention to provide prostheses which are made from a material which is not an electrical insulator and more specifically is neither a metal, a metal alloy nor a synthetic plastics material.

According to the invention, a prosthesis for implanting into a human being or other animal is made, at least substantially from carbonaceous material. Specifically, such carbonaceous material is carbon or graphite. Where the prosthesis is rigid or employs rigid parts, the preferred material therefor is dense isotropic graphites, i.e. graphites of the quality used in the manufacture of electronic jigs, rocket nozzles and nuclear reactors, the purity of which is of the order of 99% and whose mechanical characteristics are adequate to withstand the stresses involved.

The carbon or graphite is preferably in compressed block form for the manufacture of structural or load-supporting parts, and the block should be ultra-sonically tested before machining to detect structural imperfections. The parts are machined from the solid, for example, in the manufacture of integral cages or ring seatings and housings for artificial caged-ball or other heart valves.

In the production of vascular grafts and similar items, the basic material is a fabric, particularly a taffeta-woven fabric of viscose rayon or other artificial or natural cellulosic material, in the form of a seamless tube, and this material is carbonised, and/or pyrolised or graphitised, particularly on a suitable cylindrical mandrel. Thus, the surface or surfaces that come into contact with the blood or with the body tissues are constituted by carbon or graphite. Preferably, such vascular grafts or other arterial prostheses which must have the ability to elongate and flex without deformity, and which may be of simple tubular form or bifurcated, are of multiple construction, that is to say, consist of two or even more concentric tubes, the ends of which are suitably adhered, such as by a Dow Corning silicone adhesive.

Generally, such carbon or graphite members or carbonised or graphitised surfaces, to complete their fabrication in accordance with the invention as non-thrombogenic prostheses, have their outer surface or surfaces conditioned by heating to dry off moisture and any other adsorbed substances from their surface or surfaces and make the surfaces ready to absorb and have bonded thereto a coating of an anti-coagulant substance such as heparin, with the binding aid of benzalkonium or other suitable cationic surface-active agent, such as "Zephiran," hyamine 1622, hyamine 10–X, cationic amine 220 and cetyl pyridinium chloride.

Such coating is founded upon the method of V. L. Gott et al., as disclosed in "Science," vol. 142, p. 1297, and "Surgery," vol. 56, p. 404, and also on the method of Leininger as disclosed in the proceedings of the American Society of Artificial Internal Organs, vol. X, p. 213.

Although not limited thereto, an example of suitable materials for carrying the invention into effect for heart valves are given below:

(a) Graphite blocks, grade 5890, and (b) Vitreous Carbon, grade V10 or V25, these materials being manufactured by Societe le Carbone Lorraine of Paris, France, and their associated companies, and as described in their appropriate current catalogues.

A prosthesis comprising a valve seat and housing made in accordance with the present invention may generally have a shape similar to such seatings and housings or cages which are currently made by investment monocasting in the alloy "Stellite 21" or titanium, for example. However, the machining and polishing of the seating and integral housing or cage from the solid block of carbon or graphite, in accordance with the invention, is a much less costly operation than such investment casting and can readily be carried out by a skilled operator.

In order that the invention may be more clearly understood, reference will now be made to the accompanying drawings which show some embodiments thereof, by way of example, and in which:

FIG. 1 shows a section through a first form of a heart valve,

FIG. 2 shows a plan view of the valve of FIG. 1,

FIG. 3 shows a side view, partly in section, of a second form of heart valve in the closed position, FIG. 4 shows another view of the valve of FIG. 3 in the open position.

Figure 5:
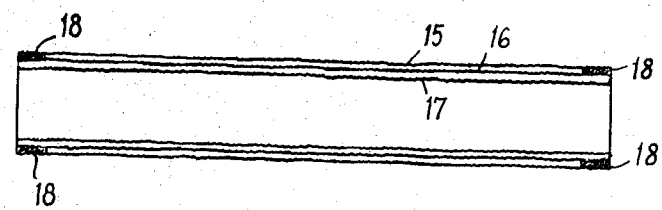
FIG. 5 shows a section through a vascular graft or other arterial prosthesis.

Referring to the drawings, FIGS. 1 and 2 show a first application of the invention to a known form of heart valve, viz that disclosed in British patent specification No. 917,341 (M. L. Edwards), but in accordance with the invention, the valve comprises a carbon or graphite cage formed by an annular tapered seating 1 in a housing having an external groove 2 and provided with integral supporting arms 3 to contain and control the movement of a silicone rubber ball 4. In order to suture the cage of the valve in position, there is provided a plurality of holes 5 in the housing which are directed from both sides and radially inwardly so that during surgery the surgeon may use a curved suture needle from one side of the seating, through the respective holes 5, and out the other side to sew it securely to the aorta or other major blood vessel. The groove 2 contains a gasket or washer 2a made from carbonised felt, for example that material made by Societe le Carbone Lorraine and referred to in their catalogues as RVC 2000, or graphitised felt also made by Societe le Carbone Lorraine and referred to in their catalogues RVG 2000 and the suture may pass through this material during surgery. This gasket or washer is firmly seated in the groove 2 with Dow Corning silicone adhesive or other suitable adhesives. After completion of the implantation and during recovery of the patient, the sutures will dissolve away but whilst this is happening, tissue fibrils will grow through the interstices of the carbonised or graphitised felt so as organically to link the prosthetic valve to the living heart. The fact that initially the sutures pass into material of the housing ensures a complete securing of the valve before it grows into position. This is a variation of the Edwards valve where the gasket or washer is of a fabric material, e.g. of P.T.F.E. alone and was used as a means for effecting the suturing of the valve in position and, in fact, these washers have been referred to in the art as a sewing ring. Polypropylene knitted fabric previously treated with colloidal graphite and subsequently heparinised according to the Gott process hereinabove referred to, may be substituted for the carbonised or graphitised felt in which case the holes 5 in the housing are not required and the sewing needle need only pass through the polypropylene fabric and the aorta wall.

A second application of the invention is shown in FIGS. 3 and 4 of another known form of valve, viz that disclosed in British registered Design Nos. 921,883, 921,884 and 925,246 (D. G. Melrose), but, in accordance with the invention, comprising a seating 6 of carbon or graphite having an annular external groove 7, the seating co-operating with a flap 8 that is located in position by a plurality of legs, two of which at 9 are longer than the third shown at 10, so that during operation the flap can pivot by the leg 10 about the seating so as to ensure that the flap shall open eccentrically. The groove 7 again accommodates a gasket of carbonised or graphitised felt or treated polypropylene knitted fabric 11, located as above, and the valve is implanted in a manner similar to that described above in connection with FIGS. 1 and 2.

In FIGS. 1 and 2 the housing and the integral cage arms are machined from solid carbon or graphite, for example, graphite 5890 or vitreous carbon V10 or V25 as hereinabove referred to and in the valve of FIGS. 3 and 4 the housing 7 and the flap 8 may be machined from similar carbon material, whilst the legs 9 and 10 are advantageously made from an organic plastics material, preferably polypropylene, suitably secured to the lenticular flap 8. One convenient method of attaching the legs 9 and 10 to the housing is firstly to tap holes 30 in the seating side of the flap at appropriate positions to receive the legs. Then an axial cut is made across the threads, e.g. by a file, and the legs are heated until they become plasticised and pushed into the tapped holes 30 of the flap, also heated to a temperature near that of the legs. On cooling, the legs are securely fixed and cannot be unscrewed owing to the presence of the axial cut which acts as a locking means. If desired, however, the flap 8 and the legs 9 and 10 may all be made from polypropylene material, suitably treated with colloidal graphite. The manufactured assembly is subsequently heparinised.

The carbon materials of the valve may be treated with the heparin and benzalkonium coatings as a whole when made up.

FIG. 5 shows a vascular graft prosthesis formed from taffeta- or other woven seamless tubes 15, 16 and 17 and may take any particular shape, for example, the tube may be bifurcated. The knitting or weaving of the tubular parts may be such and the diameter of the yarns may be such as to be able to leave optimum gaps in the mesh so as to promote maximum growth of fibrous tissue which will eventually fill the interstices, rendering the prosthesis blood-tight.

Each tube is carbonised by a baking process and on assembly a silicone adhesive, such as the Dow Corning silicone adhesive, is applied at the ends of the two outer or of all the tubular parts, as indicated at 18, so that the two outer end portions or all these end portions are securely cemented together, ready for suturing in position, the silicone adhesive stiffening the end portions to allow for greater attachability of the prostheses. It will be understood that any desired number of concentric tubular portions may be used, depending upon surgical requirements.

The porosity of such prostheses at implantation should be less than 50 ml. of water per minute per sq. cm. of fabric at a pressure difference of 120 cms. of mercury.

Figure 6:
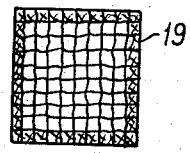
FIG. 6 shows an example of a patch.

FIG. 6 shows a patch of woven knitted carbonised or graphitised material which is useful for performing operations of the "hole-in-the-heart" variety. Such a patch may comprise one or more layers of the material suitably adhered around the edges for suturing, as indicated at 19. The patch may be of any suitable shape and has merely been shown rectangular for convenience.

Figure 7:
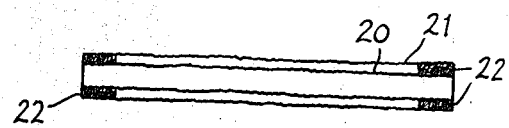
FIG. 7 shows a variation of the arrangement of FIG. 5.

To compensate for the possible physical weaknesses of prostheses formed from flexible and extensible carbon tubes according to the present invention, in some cases such tubes may be arranged as "liners" in the interior and in full contact with the interior of knitted tubular prostheses made from polypropylene or other suitable plastics material. Such liners will be suitably treated with heparin as set out above, but the exterior plastics tube must be treated with colloidal graphite and heparinised as in the Gott method referred to above. A lined prosthesis of this kind is shown in FIG. 7 where the liner of carbonised or graphitised fabric is shown at 20, the outer tube of plastics material being shown at 21. The inner and outer portions may be adhered at 22 by a suitable adhesive such as Dow Corning silicone adhesive to make the ends of the composite prostheses better able to resist the stresses of suturing.

By this means the outer polypropylene or other plastics material tube 21 will give the necessary physical strength characteristics to the artificial vein, artery or the like, whilst the treated carbon tubular liner 20 will have the anti-coagulating properties to prevent the clotting, except possibly a slight initial clotting to fill and close-in the interstices between the threads of the taffeta- or otherwise woven carbon tube; the artery is attached to the exterior woven plastics tube.

Figure 8:
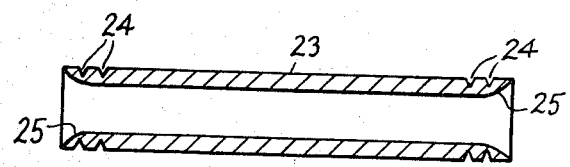
FIG. 8 shows a second variation of the arrangement of FIG. 5.

FIG. 8 shows a further variation of the arrangement of FIG. 5 in which the prosthesis is in the form of a rigid tube 23 of carbon or graphite material having notches or annular grooves 24 at its ends and the inside being slightly tapered at 25. The cut end of the diseased artery or bilary duct (ductus choledochus) is turned outwardly and downwardly for a short distance and the end of the artificial tube to be attached to the artery is brought over from the exterior of the turned back portion of the artery or bilary duct, and is attached thereto by any non-strangulating means which may engage in the annular grooves 24. This attachment means also effects the necessary pressure on the interior surface of the turned down part of the artery to facilitate this bonding with the graphite or carbon.

Figure 9:
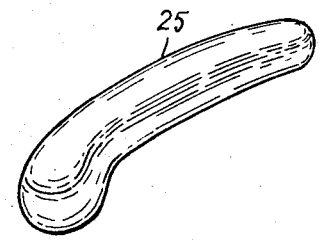
FIG. 9 shows an example of a prosthetic bone member.

FIG. 9 shows a prosthetic rib matchstick 25 as an example of use of artificial bone material which can form a substitute for load-bearing structures, but the material may be made in plates for protecting the brain, or in other, indeed any appropriate, shapes for other purposes, e.g. in ball shapes for joints. The material from which it is made is a porous carbon or graphite which is strengthened with carbon or graphite fibres either randomly or orientably distributed throughout the mass, thus obtaining the breaking characteristics of bone or wood, i.e. it bends before breaking, and the anti-friction properties of graphite in the case of ball joints are an additional advantage. These lubricating properties may be enhanced by depositing a layer of dense pyrolytic graphite over the porous material.

For example, the properties which such a material should exhibit are as follows:

Density: 1.1 to 1.2
Porosity by volume: 25 to 50%
Flexural strength: about 11.000 p.s.i.
Hardness: 50-55 Shore Other uses to which the material can be put are bone-brace laths, cups for hip-joints and elbow and knee joint bones, cortical bone and certain ducts which do not need to be flexible. In the making of protective plates it may be found desirable to render the internal and external surfaces liquid-tight by any suitable means, and they may be made from carbon grade 5890. Since the shapes of such artificial bone processes are multifarous, it is clearly neither necessary nor desirable to illustrate them herein.

Apart from the fibre-reinforced porous graphite or carbon, vitreous carbon may be used for small bones such as those in the human hand or other non-stressed part.

I claim:

1. A prosthesis comprising a heart valve consisting of an elemental carbon or graphite cage formed by an annular tapered seating in an externally grooved housing, elemental carbon or graphite, integral supporting arms projecting from said cage, a silicone rubber ball contained but free to move within said cage and located normally on said seating, said housing being apertured in a number of positions for suturing said valve into position, said apertures being directed from both sides of said housing and radially inwardly and said groove locating a gasket secured therein and projecting radially therefrom, and made from a material selected from the group consisting of graphitised felt, carbonised felt and a polypropylene knitted fabric treated with colloidal graphite.

2. A prosthesis comprising a heart valve consisting of an annularly externally grooved seating made from elemental carbon or graphite, an elemental carbon or graphite lenticular flap for co-operation with said seating, said flap having projecting therefrom a plurality of legs passing through said seating and being outwardly hooked to prevent said flap falling through said seating, and said groove containing a gasket of a material selected from the group consisting of graphitised felt, carbonised felt and a polypropylene knitted fabric treated with colloidal graphite.

3. A prosthesis according to claim 2, in which said flap is provided with three legs, two of which are longer than the third, and said legs being made from an organic plastics material secured in position in apertures in said lenticular flap.

4. A prosthesis comprising a patch, consisting of at least two layer of carbonised or graphitised material, said layers being joined together at their peripheral areas by adhesive for stiffening the peripheral areas, ready for suturing.

5. A prosthesis for implanting into the body of a living mammal which comprises at least one tube made of a carbonized or graphitized cellulosic fabric having a porosity such that less than 50 ml. of water per minute will pass through a square centimeter of said fabric at a pressure difference of 120 cm. of mercury.

6. A vascular graft as claimed in claim 5 comprising an additional tube encircling first-mentioned tube and made of an organic plastics material treated with colloidal graphite, the ends of said tubes being adhered together for receiving sutures.

7. A prosthesis as claimed in claim 5 comprising two concentric carbonized or graphitized fabric tubes having their ends adhered together to receive sutures.

8. An artificial bone process for implanting into the body of a living mammal and adapted to make direct contact with said body without increasing the incidence of thrombosis in said mammal, said process being a solid artcle made of material selected from the group consisting of porous carbon and graphite reinforced with carbon or graphite fibres, and having a density between 1.1 and 1.2, a porosity between 25 and 50% by volume, and a Shore hardness between 50 and 55.

References Cited

UNITED STATES PATENTS

| | | | |
|---|---|---|---|
| 444,471 | 1/1891 | Ward | 313—356 XR |
| 460,680 | 10/1891 | Libbey | 313—356 XR |
| 542,625 | 7/1895 | Cabirau | 313—356 XR |
| 3,297,903 | 1/1967 | Riek | 174—94 XR |
| 3,099,016 | 7/1963 | Edwards | 3—1 |
| 3,105,492 | 10/1963 | Jeckel | 128—334 |
| 3,107,152 | 10/1963 | Ford et al. | 23—209.2 |
| 3,124,136 | 3/1964 | Usher | 128—334 |
| 3,181,933 | 5/1965 | Wentorf | 23—209.2 XR |
| 3,308,943 | 3/1967 | Davila | 23—209.2 XR |
| 3,374,489 | 3/1968 | Diaz | 3—1 |
| 3,396,409 | 8/1968 | Melrose | 3—1 |

FOREIGN PATENTS

| | | |
|---|---|---|
| 661,896 | 4/1963 | Canada. |
| 1,021,056 | 11/1952 | France. |
| 1,016,811 | 1/1966 | Great Britain. |

(Other references on following page)

OTHER REFERENCES

"The Coating of Intravascular Plastic Prostheses With Colloidal Graphite" by Vincent L. Gott et al., Surgery, vol. 50, No. 2, pp. 382–389, August 1961.

"Prosthetic Replacement of the Mitral Valve," The Lancet, Nov. 24, 1962, page 1087.

RICHARD A. GAUDET, Primary Examiner

R. L. FRINKS, Assistant Examiner

U.S. Cl. X.R.

128—92, 334; 23—209.2